United States Patent
Hasei et al.

(10) Patent No.: US 7,566,156 B2
(45) Date of Patent: *Jul. 28, 2009

(54) METHOD OF MANUFACTURING BACKLIGHT UNIT, BACKLIGHT UNIT, ELECTROOPTICAL DEVICE AND ELECTRONIC EQUIPMENT

(75) Inventors: Hironori Hasei, Okaya (JP); Akira Inagaki, Suwa (JP)

(73) Assignee: Seiko Epson Corporation (JP)

( * ) Notice: Subject to any disclaimer, the term of this patent is extended or adjusted under 35 U.S.C. 154(b) by 181 days.

This patent is subject to a terminal disclaimer.

(21) Appl. No.: 11/423,562

(22) Filed: Jun. 12, 2006

(65) Prior Publication Data

US 2006/0291239 A1 Dec. 28, 2006

(30) Foreign Application Priority Data

Jun. 13, 2005 (JP) ............................. 2005-171955

(51) Int. Cl.
*F21V 11/00* (2006.01)

(52) U.S. Cl. ........................... 362/558; 362/26; 362/27; 362/600; 362/603; 362/606

(58) Field of Classification Search ................ 362/558, 362/26, 27, 600, 603, 606, 607, 618–620, 362/355; 359/599; 385/14, 129–132, 901
See application file for complete search history.

(56) References Cited

U.S. PATENT DOCUMENTS

| 7,259,810 B2 * | 8/2007 | Kim .............................. 349/67 |
| 2005/0007669 A1 * | 1/2005 | Sakai .......................... 359/619 |

FOREIGN PATENT DOCUMENTS

| JP | 63-068814 | 3/1988 |
| JP | 06-075220 | 3/1994 |
| JP | 06075220 | * 3/1994 |
| JP | 2000-105550 | 4/2000 |
| JP | 2000-292790 | 10/2000 |
| JP | 2002-107510 | 4/2002 |
| JP | 2004-157430 | 6/2004 |
| JP | 2004-191611 | 7/2004 |
| JP | 2004-240294 | 8/2004 |
| JP | 2004-309801 | 11/2004 |

* cited by examiner

*Primary Examiner*—Sandra O'Shea
*Assistant Examiner*—Mark Tsidulko
(74) *Attorney, Agent, or Firm*—Harness, Dickey & Pierce, P.L.C.

(57) ABSTRACT

A backlight unit includes a light source emitting light and a light diffusing plate diffusing light emitted from the light source, the light diffusing plate having an ellipsoidal microlens, the ellipsoidal microlens being provided in a plural number and a major axis direction of the microlens being substantially orthogonal to a longer axis direction of the light source.

8 Claims, 8 Drawing Sheets

METHOD OF MANUFACTURING BACKLIGHT UNIT, BACKLIGHT UNIT, ELECTROOPTICAL DEVICE AND ELECTRONIC EQUIPMENT

BACKGROUND OF THE INVENTION

1. Technical Field

The present invention relates to a method of manufacturing a backlight unit, a backlight unit, an electrooptical device and electronic equipment.

2. Related Art

In a liquid crystal display device, which is an electrooptical device, an optical sheet having a plurality of microlenses is provided in a backlight unit which is embedded in the liquid crystal display device and illuminates the liquid display. With this optical sheet, it is possible to efficiently collect light from a light source in the backlight unit and send it to the liquid crystal elements (picture elements). JP-A-2004-157430 is a first example of related art. There are many reports about a method of forming the microlens by using a droplet discharge method including the first example.

JP-A-2004-309801 is a second example of related art. For example, the second example discloses an edge-light type (side-light type) backlight unit in which a linear lamp is provided as the light source along a side face of a light guide plate. A plurality of the elliptical microlenses having a major axis and a minor axis are formed on a sheet made of synthetic resin and the like. A method of fabricating such microlens by using a metal mold has been proposed.

However, according to such method, there is a limit to the number of the linear lamps which can be embedded with the unit so that enough brightness for the display could not be secured in a case of the large screen. Moreover, it is difficult to make the size of the display device larger because the weight of light guide plate becomes too heavy. For this reason, the liquid crystal panel with the edge-light type backlight unit has a low brightness though unevenness of the brightness in the screen can be reduced. On the other hand, in a case of a backlight unit in which the linear lamps are located immediately below the screen, it is possible to increase the number of the lamps provided therein in order to increase the brightness of the screen according to the size of the screen. However, when the number of the lamps increases, problems of heat and cost could arise.

SUMMARY

An advantage of the invention is to provide a method of manufacturing a backlight unit with which the brightness can be increased, a backlight unit with fine optical characteristics, an electrooptical device and electronic equipment thereof.

According to a first aspect of the invention, a backlight unit includes a light source emitting light and a light diffusing plate diffusing light emitted from the light source, the light diffusing plate having an ellipsoidal microlens, the ellipsoidal microlens being provided in a plural number and a major axis direction of the microlens being substantially orthogonal to a longer axis direction of the light source.

According to the first aspect of the invention, the microlens in the backlight unit has the minor axis whose curvature is larger than that of the major axis so that light is less diffused and the brightness is higher in the major axis direction in the microlens. Furthermore, the microlens is provided in such a way that the longitudinal axis direction of the light source is orthogonal to the longitudinal axis direction of the microlens so that it is possible to decrease the amount of light leaking out from the peripheral of the screen in all direction. Therefore, the brightness can be increased. In this way, the highly luminous backlight unit can be provided.

In this case, it is preferable that the backlight unit is placed directly below a display screen.

If the backlight unit is a direct backlight type, a linear lamp is provided between a reflecting plate and the diffusing plate so that light leakage can be reduced. Accordingly, it is possible to provide the highly luminous backlight unit.

It is also preferable that the microlenses are arranged in a staggered alignment. In this way, the amount of light passing through the microlens is increased because more microlenses can be provided compared to the case in which the microlenses are not arranged in the staggered alignment. Light will be less diffused in the orthogonal direction to the longer axis direction of the light source (in other words, the major axis direction of the microlens). Accordingly, it is possible to provide the backlight unit with a higher brightness.

It is preferable that the microlens is formed by a droplet discharge method.

In this case, the microlens is formed by the droplet discharge method. This means that it is not necessary to make a metal mold and will not cost to make the mold. In addition, design change such as a figure (size) and a position change can be easily done by changing the conditions of the droplet discharge.

According to a second aspect of the inventions a method of manufacturing a backlight unit that has a light source emitting light and a diffusing plate diffusing light emitted from the light source, includes a step of forming the diffusing plate that has an ellipsoidal microlens, the ellipsoidal microlens being provided in a plural number, and a step of assembling the backlight unit in such a way that a major axis direction of the microlens becomes substantially orthogonal to a longer axis direction of the light source.

According to the second aspect of the invention, the microlens in the backlight unit has the minor axis whose curvature is larger than that of the major axis so that light is less diffused and the brightness is higher in the major axis direction in the microlens. Furthermore, the microlens is provided in such a way that the longitudinal axis direction of the light source is orthogonal to the longitudinal axis direction of the microlens so that it is possible to decrease the amount of light leaking out from the peripheral of the screen in all direction. Therefore, the brightness can be increased. In this way, the highly luminous backlight unit can be provided.

In this case, it is preferable that the backlight unit is assembled in such a way that the light source is placed directly below a display screen.

If the light source is the direct backlight type, a linear lamp is provided between a reflecting plate and the diffusing plate so that light leakage can be reduced. Accordingly, it is possible to provide the highly luminous backlight unit.

It is also preferable that the microlenses are arranged in a staggered alignment. In this way, the amount of light passing through the microlens is increased because more microlenses can be provided compared to the case in which the microlenses are not arranged in the staggered alignment. Light will be less diffused in the orthogonal direction to the longer axis direction of the light source (in other words, the major axis direction of the microlens). Accordingly, it is possible to provide the backlight unit with a higher brightness.

It is also preferable that the microlens is formed by a droplet discharge method. Specific examples of the fabrication method of the microlens by using the discharge method are described as follows: A first fabrication method includes a step of providing a droplet of a lens material on a substrate, a step of making the droplet elliptical shape by providing another droplet so as to overlap a part of the disposed droplet before the droplet gets harden, and a step of curing the elliptical droplet; A second fabrication method includes a step of providing a first droplet of a lens material on a substrate, a step of curing the first droplet to form a lens, a step of providing a second droplet so as to overlap a part of the first droplet, the amount of the second droplet is smaller than that of the first droplet, a step of curing the second droplet to form a elliptical lens, a step of further providing a third droplet so as to overlap a part of the elliptical lens and at the opposite side of the second droplet, and a step of curing the third droplet; A third fabrication method includes a step of providing a first droplet of a bank material on a substrate, a step of curing the first droplet provided on the substrate to form a base having an elliptical figure, a step of providing a second droplet of a lens material on the elliptical base, and a step of curing the second droplet to form a elliptical lens, and a step of curing the second droplet; and A forth fabrication method includes a step of providing a plurality of droplets of a lens material on a substrate in such a way that each of the droplets is separately provided, a step of curing the plurality of the droplets to form a plurality of lenses, a step of further providing droplets among the lenses, and a step of curing the droplets.

In this case, the microlens is formed by the droplet discharge method. This means that it is not necessary to make a metal mold and will not cost to make the mold. In addition, design change such as a figure (size) and a position change can be easily done by changing the conditions of the droplet discharge. It is also possible to improve the productivity of the backlight unit because the microlens can be easily fabricated by the method according to the second aspect of the invention.

According to a third aspect of the invention, an electrooptical device includes a liquid crystal panel and the above-mentioned backlight unit.

According to the third aspect of the invention, the highly luminous backlight unit is provided in the electrooptical device so that it is possible to provide the electrooptical device with a high brightness. Furthermore, it is possible to improve the productivity of the backlight unit and the electrooptical device because the diffusing plate having the elliptical microlens can be easily manufactured by the droplet discharge method according to the above-described method.

According to a forth aspect of the invention, electric equipment includes the above-mentioned electrooptical device.

According to the forth aspect of the invention, it is possible to provide the electrooptical device in which a display quality can be improved because it has the electrooptical device with a high brightness. Furthermore, it is also possible to improve the productivity of the electronic equipment because the electrooptical device can be easily manufactured according to the above-described method.

BRIEF DESCRIPTION OF THE DRAWINGS

The invention will be described with reference to the accompanying drawings, wherein like numbers reference like elements.

DESCRIPTION OF THE EMBODIMENTS

In the following embodiment, a backlight unit equipped with a diffusing plate on which microlens having an elliptical shape is formed on a substrate by a droplet discharge method will be described. The microlens is provided in such a way that the longitudinal axis direction of the linear lamp is orthogonal to the longitudinal axis direction of the elliptical microlens.

Figure 1:
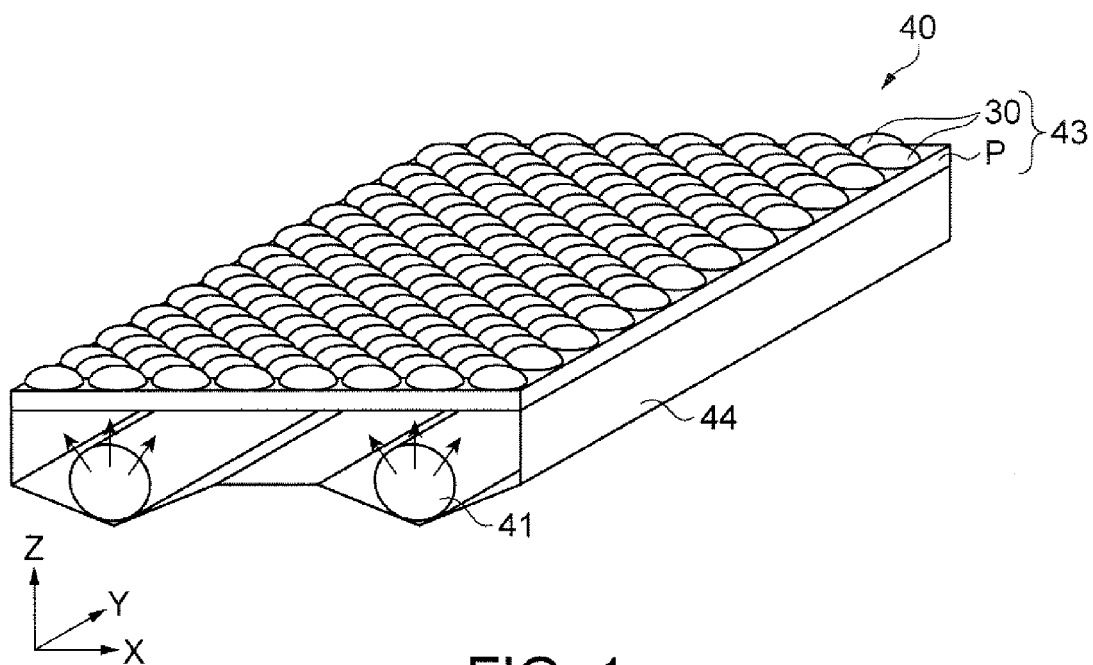
FIG. 1 is a schematic perspective view showing an example of a backlight unit according to an embodiment of the invention.

FIG. 1 is a schematic perspective view showing an example of a backlight unit 40 according to the embodiment. The backlight unit 40 according to the embodiment of the invention is now described with reference to FIG. 1.

As shown in FIG. 1, the backlight unit 40 is provided directly below a microlens which is so called a direct backlight. The backlight unit 40 includes a linear lamp 41 which is a light source, a diffusing plate 43 which diffuses light from the linear lamp 41, and a reflecting plate 44 which reflects light. The diffusing plate 43 is a substrate P on which a microlens 30 having an elliptical shape is formed in a plural number. The linear lamp 41 is provided in a plural number (two lamps are provided in this embodiment). The linear lamp 41 is placed between the reflecting plate 44 and the diffusing plate 43. Light emitted from the linear lamp 41 illuminates the back side of the substrate P.

The structure of the backlight unit 40 was described above and how light from the backlight unit 40 travels is now described.

When the linear lamp 41 is turned on, light is emitted from the linear lamp 41 and enters the back side of the substrate P. A part of light emitted from the linear lamp 41 will be reflected by the reflecting plate 44 and then enters the substrate P. The emitted and reflected light which entered the substrate P is diffused by the elliptical microlens 30 and then exits. Light entered the substrate P is reflected by a pattern (not shown in the figure) formed on the back side of the substrate P. The pattern is arranged in such a way that the amount of light passing through the substrate P becomes even in the plane (not shown in the figure).

Figure 2:
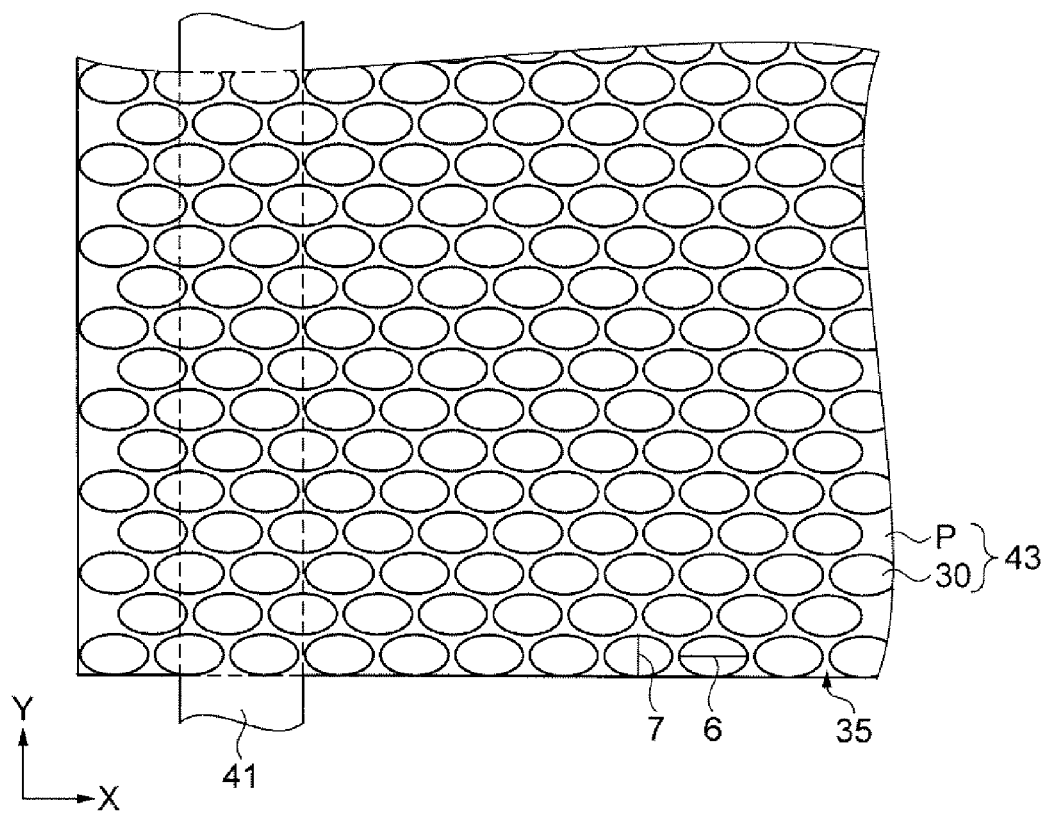
FIG. 2 illustrates an example of a light diffusing plate.

FIG. 2 illustrates an example of a light diffusing plate 43. The light diffusing plate 43 according to the embodiment is hereunder described.

As shown in FIG. 2, the light diffusing plate 43 has the substrate P and the plurality of the microlenses 30 (a microlens array 35) formed on the surface of the substrate. Each microlense 30 has an elliptical shape.

The substrate P is made of a light transmissive synthetic resin, particularly colorless transparent synthetic resin so that light can be transmitted through the substrate. Any synthetic resin can be used to form the substrate P. For example, a polyethylene terephthalate, a polyethylene naphthalate, acrylate resins, a polycarbonate, a polystyrene, a polyolefin, a cellulose acetate, a weather-resistant polyvinyl chloride, radiation curing resins and the like can be used.

A thickness (average thickness) of the substrate P is not especially limited. It can be 10-500 μm, preferably 35-250 μm, more preferably 50-188 μm. If the thickness of the substrate P is less than the above-mentioned range, the substrate is likely to curl when it is exposed to heat in the back light unit, and it becomes difficult to handle the substrate. If the thickness of the substrate P exceeds the above-mentioned range, the brightness of the liquid crystal display device could be decreased. Moreover, it also increases the overall thickness of the backlight unit, and this runs counter to a demand for a thinner liquid crystal display.

The microlens array 35 has the plurality of the elliptical microlenses 35 which are formed on the surface of the substrate P so as to protrude from the surface. The elliptical microlens 30 has a convex shape.

The elliptical microlens 30 has a major axis 6 and a minor axis 7. The curvature of the major axis is smaller than that of the minor axis in the microlens 30 so that light is less diffused and the brightness is higher in the major axis direction. The elliptical microlens 30 has the convex and ellipsoidal shape.

The plurality of the elliptical microlenses 30 is geometrically arranged on the surface of the substrate P in a relatively high density. More specifically, the elliptical microlenses 30 are arranged in a staggered alignment on the substrate P surface. The pitch or the distance between the two microlenses is constant. The staggered alignment enables the microlenses 30 having the elliptical shape in plane to be most densely arranged on the substrate. Accordingly, it is possible to improve the optical feature of the diffusing plate 43 such as a light condensing ability and a light diffusing ability.

Furthermore, the area where the elliptical microlens 30 is not provided on the substrate P becomes small when the elliptical microlenses 30 are densely arranged in the staggered alignment on the substrate P. Consequently, light which passes through the microlens 30 increases and this improves light condensing ability. Therefore, in this way, it is possible to configure the backlight unit 40 (see FIG. 1) with a high luminosity.

Figure 3:
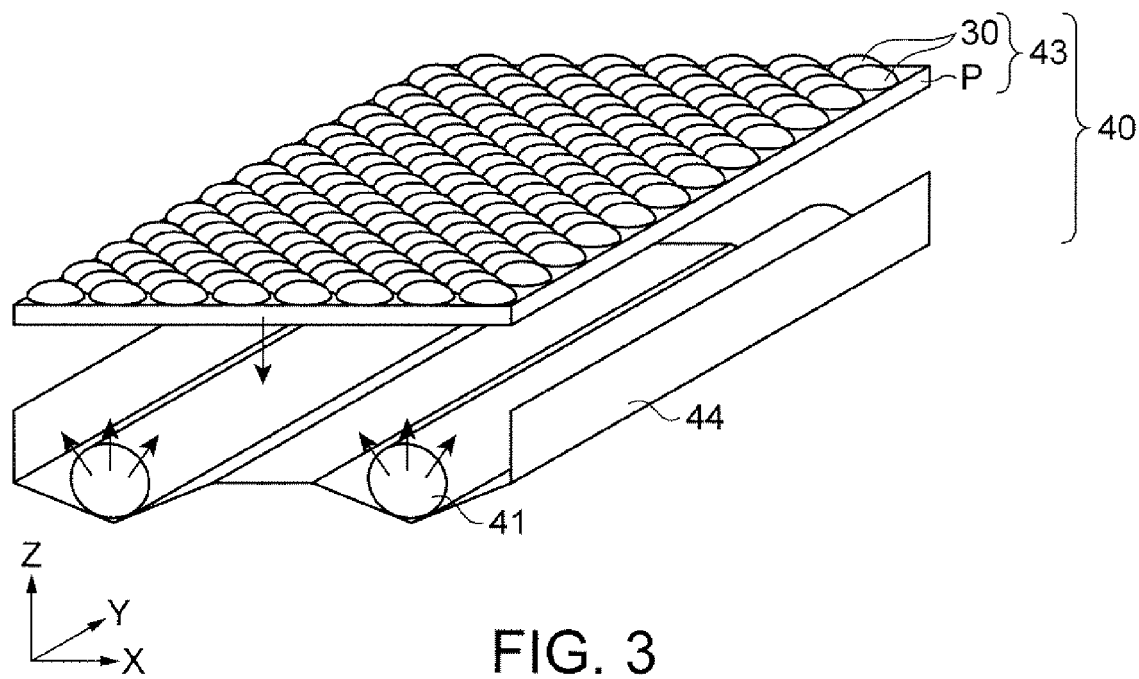
FIG. 3 shows an example of a way to assemble the backlight unit.

FIG. 3 shows an example of a way to assemble the backlight unit according to the embodiment. How to assemble the backlight unit according to the embodiment is now described with reference to FIG. 3.

As shown in FIG. 3, the backlight unit 40 is assembled by engaging the diffusing plate 43 with the reflecting plate 44 on which the linear lamp 41 is provided. For example, this can be carried out by placing the diffusing plate 43 onto the reflecting plate 44. In this way, the backlight unit 40 is completed as shown in FIG. 1. This backlight unit 40 has a high luminosity so that it is not necessary to increase the number of the linear lamp 41 which is the light source of the backlight unit. Accordingly, it is possible to solve the problems of the heat generated by the linear lamp 41, a manufacturing cost and the weight of the lamp. Moreover, it is possible to provide lighter backlight unit 40.

Next, the droplet discharge method by which the elliptical microlens 30 is formed is hereunder described. A method of discharging droplets, a surface treatment method, a bank material, a microlens material and a method of curing the microlens material used in the droplet discharge method are described in order.

Method of Discharging Droplets

Discharging techniques of the droplet discharge method include an electrification controlling method, a pressurizing and oscillating method, an electromechanical converting method, an electro-thermal converting method, an electrostatic attracting method and the like. In the electrification controlling method, an electric charge is given to a material through an electrification electrode and the material is discharged from a discharge nozzle. The discharge direction of the material can be controlled by a deflecting electrode. Moreover, in the pressurizing and oscillating method, a high pressure of about 30 kg/cm$^2$ is applied to a material so as to discharge the material from the tip of the nozzle. When a control voltage is not applied, the material goes straight and is discharged from the nozzle. When the control voltage is applied, due to an electrostatic repulsion generated in the material, the material is dispersed and will not be discharged from the nozzle. In the electrothermal converting method, a piezoelectric element deforms when it receives a pulsed electric signal. The electrothermal converting method utilizes this property and the deformation of the piezo element gives a pressure through a flexible substance to a space storing a material. The material is then pushed out of the space and discharged from the discharge nozzle.

Furthermore, in the electrothermal converting method, the material is rapidly gasified so as to generate bubbles by a heater provided in a space storing the material, so that the material in the space is pushed out and discharged by the pressure of the bubbles. In the electrostatic attracting method, a micro-pressure is applied to a space storing the material and a meniscus of the material is formed in the nozzle, in which state an electrostatic attractive force is applied so as to draw the material out. In addition to these methods, such techniques as using a viscosity variation of a fluid due to an electric field, and blowing the material out by an electric discharge spark, and the like are also applicable. The advantage of the droplet discharge method is that the amount of waste in the used material becomes less, and the desired amount of the material can be surely disposed on a desired position. The amount of a single drop of a liquid material discharged by the droplet discharge method will be, for example, 1-300 ng.

Figure 4:
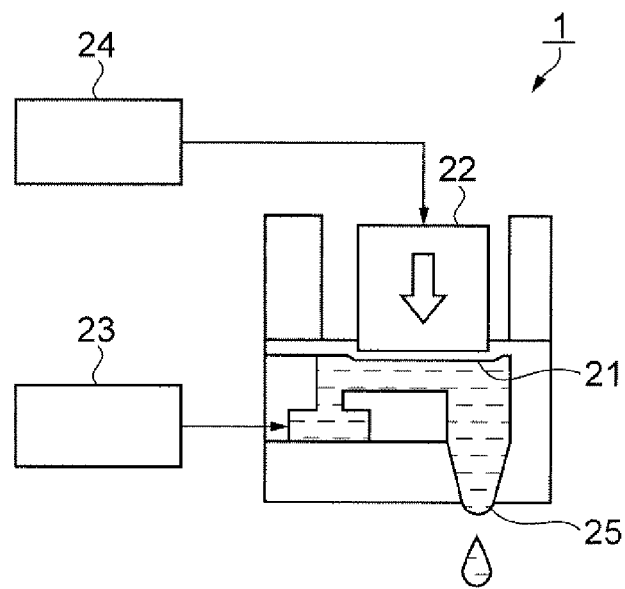
FIG. 4 is a drawing for describing a discharge mechanism of a liquid material by a piezo method.

FIG. 4 is a drawing for explaining a discharging mechanism of a liquid material by a piezo method.

In FIG. 4, a piezo element 22 is provided adjacent to a liquid room 21 that holds a liquid material. The liquid material is supplied to the liquid room 21 through a liquid material supply system 23 including a material tank that stores the liquid material. The piezo element 22 is coupled to a driving circuit 24. Voltage is applied to the piezo element 22 through the driving circuit 24 and the piezo element 22 is deformed. The liquid room 21 is then deformed by the deformation of the piezo element 22 and the liquid material is discharged from a discharge nozzle 25. In this case, a degree of the distortion of the piezo element 22 is controlled by changing a value of the applied voltage. A distortion speed of the piezo element 22 is controlled by changing a frequency of the applied voltage. According to the piezo method, the material will not be heated so that there is an advantage that the composition of the discharged material is hardly affected.

Surface Treatment Method

A surface treatment method in this embodiment includes a method to form an organic thin film on a surface of a substrate, a plasma treatment and the like. The organic thin film is formed on the substrate in order to give a liquid-repellency to the surface of the substrate and in order to control a contact angle of a discharged droplet. Cleaning process is preferably carried out as a pre-treatment process before the liquid-repellency is given to the substrate. For such cleaning process, for example, ultra violet (UV) cleaning, UV/ozone cleaning, plasma cleaning, acid/alkaline cleaning and the like can be adopted.

In the method of forming the organic thin film which imparts the liquid-repellency, an organic thin film made of organic molecules such as silane compounds and surface active agents is formed on a substrate surface where a wiring pattern is going to be formed.

The organic molecules with which the substrate surface is treated have a functional group which is capable of physically or chemically being combined with the substrate. The organic molecules also has a functional group which modifies the quality of (i.e., controls the surface energy of) the substrate surface such as a hydrophilic group or hydrophobic group positioned at the opposite side of the substrate-combining functional group. The organic molecules are coupled to the substrate, form the organic thin film and ideally consist a monomolecular film. Particularly, an organic molecule in which an organic structure connecting the substrate-combining functional group with the surface quality modifying functional group positioned at the opposite side is a carbon straight chain or a carbon chain partially branched off, will combine with the substrate, be then self assembled, and form a dense self-assembled layer.

The self assembled layer is a film consisting of an oriented compound having combinative functional groups which can react with the constituent atoms of an under-layer of the substrate, and other structures such as straight-chain structures and aromatic ring structures. The compound is highly oriented due to van der Waals interactions between straight-chain structures and π-π stacking among the aromatic ring structures. Such self assembled layer is formed of aligning oriented mono-molecules so that it can be made extremely thin, and moreover it can be very uniform at a molecular level. In other words, since the same kind of molecules is positioned in the film surface, it has a very uniform film surface and an excellent liquid repellency or affinity could be given to the film surface.

As such highly oriented compound, for example, a silane compound represented by $R^1SiX^1_aX^2_{(3-a)}$: wherein $R^1$ is an organic group; $X^1$ and $X^2$ are —$OR^2$, —$R^2$, —Cl; $R^2$ contained in $X^1$ and $X^2$ is an alkyl group with the carbon number of 1-4; and m is an integer of 1-3.

The silane compound of the formula $R^1SiX^1_aX^2_{(3-a)}$ is a compound in which a silane atom is substituted by an organic group and other binding groups in the silane compound are substituted by alkoxy groups, alkyl groups or chlorine groups. The organic group R1 can be a phenyl group, a benzyl group, a phenethyl group, a hydroxyphenyl group, a chlorophenyl group, an aminophenyl group, a naphthyl group, a thianthrenyl group, a pyrenyl group, a thienyl group, a pyrrolyl group, a cyclohexyl group, a cyclohexenyl group, a cyclopentyl group, a cyclopentenyl group, a pyridinyl group, a methyl group, an ethyl group, a n-propyl group, an isopropyl group, a n-butyl group, an isobutyl group, a sec-butyl group, a tert-butyl group, a n-hexyl group, a n-octyl group, a n-decyl group, a n-octadecyl group, a chloromethyl group, a methoxyethyl group, a hydroxyethyl group, an aminoethyl group, a cyano group, a mercaptopropyl group, a vinyl group, an allyl group, an acryloxyethyl group, a metacryloxyethyl group, a glycydoxypropyl group, an acetoxy group or the like.

$X^1$ is an alkoxy group, a chlorine group or a functional group that forms Si—O—Si bond and the like. Accordingly, $X^1$ is hydrolyzed by water and desorbed as an alcohol or acid. As such alkoxy group, a methoxy group, an ethoxy group, an n-propoxy group, an isopropoxy group, n-butoxy group, an n-isobutoxy group, a sec-butoxy group, a tert-butoxy group and the like can be named.

The carbon number of $R^2$ preferably lies within the range of 1-4 because molecular weight of a desorbed alcohol molecule becomes relatively small and it can be easily removed. Moreover, it is possible to prevent the density of the formed film from becoming lower.

A fluorine-alkylsilane compound where R1 has a perfluoroalkyl structure of $C_nF_{2n+1}$ and n is the integer of 1-18 can be named as the typical water-repellant silane compound of the formula $R^1SiX^1aX^2_{(3-a)}$. With the fluorine-alkylsilane compound, the self-assembled layer is formed by aligning chemical compounds in such a way that the fluoroalkyl groups position in the surface of the film. In this way, a uniform liquid repellency can be given to the film surface.

Such silane compounds having the fluoroalkyl group or a perfluoroalkylether structure are generally called as "FAS". This chemical compound may be used alone or more than one kind of the chemical compounds combined may be adopted. By using the FAS, it is possible to obtain a firm adhesion with the substrate and a fine liquid repellency.

In addition to the silane compound, a surface active agent represented by $R^1Y^1$ can also be used since it is also highly oriented. $R^1$ denotes a hydrophobic organic group. $Y^1$ denotes a hydrophilic polar group such as —OH, —($CH_2CH_2O$)nH, —COOH, —COOA, —$CONH_2$, —$SO_3H$, —$SO_3A$, —$PO_3H_2$, —$PO_3A$, —$NO_2$, —$NH_2$, —$NH_3B$ (ammonium salt), ≡NHB (pyridinium salt) and —$NX^1_3B$ (alkylammonium salt) or the like, where "A" indicates one or more than one positive ion, "B" indicates one or more than one negative ion, and $X^1$ is the alkyl group with the carbon number of 1-4 as described before.

The surface active agent of the formula $R^1Y^1$ is amphiphile and a compound in which a hydrophilic functional group is coupled to the lipophilic organic group $R^1$. $Y^1$ denotes a hydrophilic polar group that combines or adsorbs with the substrate. The organic group $R^1$ is lipophilic and aligns at the opposite side to a hydrophilic face so as to form a lipophilic face on the hydrophilic face.

A fluorine-alkyl surface active agent can be named as the typical water-repellant silane compound of the formula $R^1Y^1$. The fluorine-alkyl surface active agent of the formula $R^1Y^1$ has a structure where $R^1$ has a perfluoroalkyl structure of $C_nF_{2n+1}$ with n of the integer of 1-18 or the perfluoroalkylether structure.

These surface active agents having the perfluoroalkyl structure or the perfluoroalkylether structure can be used alone or more than one of them combined thereof can also be used. With the surface active agent having the perfluoroalkyl group, it is possible to obtain firm adhesion with the substrate and a fine liquid repellency.

Moreover, the alkyl structure does not necessarily include fluorine. A typical surface active agent may also be used to obtain the water-repellency by forming a dense film.

The organic film consisting of the organic molecules such as the silane compound, the surface active agent and the like is formed on the substrate P when the above-mentioned material chemical compound and the substrate P are contained in the same sealed container and left for two to three days at room temperature. Alternatively, the organic film can be formed by keeping the whole sealed container at a temperature of 80-140° C. for about 1-3 hours. It should be understood that, although the organic film is formed from a gas phase in the above forming method, such self-assembled film may also be formed from a liquid phase. For example, the self assembled film is formed on the substrate by immersing the substrate in a solution which contains the material chemical compound for about 30 minuets to 6 hours, cleaning the substrate, and then drying it. If the solution containing the material chemical compound is heated to 40-80° C., the self assembled film can be formed by immersing the substrate for 5 minutes to 2 hours.

In a plasma treatment method, the substrate P is irradiated with plasma under atmospheric pressure or vacuum. A type of gas used in the plasma treatment can be appropriately selected in consideration of the surface material of the substrate and the like. For example, tetra-fluoromethane, perfluorohexane, perfluorodecane and the like can be used. Conditions for performing the plasma processing method (a $CF_4$ plasma processing method) using the tetrafluoromethane gas as the process gas are, for example, at a plasma power of 50-1000 W, a flow rate of a carbon tetrafluoride gas of 50-100 ml/min, a relative shifting speed of the substrate with respect to a plasma discharge electrode of 0.5-1020 mm/sec, and a substrate temperature of 70-90° C.

Material for Bank

Material for forming a bank in the embodiment according to the invention is not especially limited as long as it is in a liquid state so that it can be discharged in the course of the forming process and it can be solidified after it was discharged. For example, a solution of a resin which is dissolved in a solvent is adoptable. The solution is applied to form the bank and then the solvent will be removed. In addition to this, as the material of the bank, there are a thermoplastic resin, a thermosetting resin, a photo-curing resin, a resin solution and particles dispersed in a solution.

Organic material including polyimide, an acrylic resin and novolac-series resin is typically used to form the bank. In addition to these materials, oligomers and polymers such as polyvinyl alcohol, unsaturated polyester, methyl-methacryl resin, polyethylene, diallyl phthalate, ethylene-propylene-diene monomer, epoxy resin, phenol resin, polyurethane, melamine resin, polycarbonate, polyvinyl chloride, polyamide, stylene-butadiene rubber, chloroprene rubber, polypropylene, polybutylene, polystyrene, polyvinyl acetate, polyester, polybutadiene, polybenzimidazole, polyacrylonitrile, epichlorohydrin, polysulfide, polyisoprene and the like can be adopted to form the bank.

The bank material should neither react with the resin that contacts with the material nor dissolve in a solution. For this reason, it is preferred to use the thermo-setting or photo-curing resins which can be harden after it is discharged.

The photo-curing resin used here typically has at least one functional group which is ionically or radically polymerized with ions or radicals generated by photo irradiation to a photo polymerization initiator. Molecular weight increases with the ion or radical polymerization, and a monomer or an oligomer that forms a cross-linked structure may be further added if necessary. The photo-curing resin is such hardened resin composition including the functional group, the photo polymerization initiator and the monomer or oligomer. Here, the functional group means an atom group or a coupling scheme which reacts with the vinyl group, a carboxy group, the amino group, a hydroxyl function, an epoxy group and the like.

The thermo-setting resin used here typically has at least one functional group which is ionically or radically polymerized with ions or radicals generated by heating a heat polymerization initiator. Molecular weight increases with the ion or radical polymerization, and a monomer or an oligomer that forms a cross-linked structure may be further added if necessary. The thermo-setting resin is such hardened resin composition including the functional group, the photo polymerization initiator and the monomer or the oligomer. Here, the functional group means the atom group or the coupling scheme which reacts with the vinyl group, the carboxy group, the amino group, the hydroxyl function, the epoxy group and the like.

In case of a resin solution such as varnish, a polymer having an adequate heat resistance such as polyimide is dissolved in the solution in advance, and then it is separated out by drying. In this way, the bank can be formed from the resin solution without hardening it by light or heat.

Particle dispersion liquid can also be used to form the bank since a fine heat resistance and optical transparency can be obtained. The particle may be made of silica, alumina, titania, calcium carbonate, aluminum hydroxide, acrylic resin, organic silicone resin, polystyrene, urea resin, formaldehyde condensate and the like, or any combination thereof. In the case of the particle, the bank is made by condensing the particles which are dried and deposited. A surface of the particle may be treated so as to impart photosensitivity or thermosensitivity to the surface in order to enhance the adhesiveness between the particle and a particle on a substrate.

If necessary, a small amount of a surface tension regulator such as fluorinated, silicon-like and nonionic regulator can be added into a droplet of the above-mentioned bank material provided it will not impair a necessary function of the bank. These surface tension regulators improve a wettability of the object to which the liquid material is applied. This helps to improve a leveling property of the applied film and to prevent bubbles from being generated like rash in the film.

The droplet of the bank material prepared in the above-mentioned way preferably has a viscosity of 1-50 mPa·s. This is because when the solution is discharged by the droplet discharge device, if the viscosity is smaller than 1 mPa·s, the area around the nozzle could be easily contaminated by a spill of the droplet. If the viscosity is larger than 50 mPa·s the frequency of clogging occurring at the nozzle hole increases, making it difficult to smoothly discharge droplets. More preferably, the viscosity lies within the range of 5-20 mPa·s.

Furthermore, the droplet of the prepared bank material preferably has a surface tension of 1-50 mPa·s. This surface tension lies in the range of 0.02-0.07 N/m. This is because when the solution is discharged by the droplet discharge device, if the surface tension is less than 0.02 N/m, the wettability of the droplet with respect to the nozzle surface increases so that the discharge direction tends to be deviated. If the surface tension exceeds 0.07 N/m, the shape of the meniscus at the tip of the nozzle becomes unstable, making it difficult to control the discharge amount and the discharge timing of the droplet.

Material for Microlens

Material for forming the elliptical microlens 30 in the embodiment according to the invention is not especially limited provided it is in a liquid state so that it can be discharged in the course of the forming process, it can be solidified after it was discharged, and it has an optical transparency after solidified so that it can serve as a lens. For example, a solution of a resin which is dissolved in a solvent and has the optical transparency is adoptable. The solution is applied to form the microlens and then the solvent will be removed. In addition to this, as the material of the microlens, there are resins such as the thermoplastic resin, the thermosetting resin, and the photo-curing resin. However, the photo-curing resin is preferable because it can be easily and quickly cured and the lens material and a base material will not be heated to a high temperature when it is cured.

Such photo-curing resin typically has at least one functional group which is ionically or radically polymerized with ions or radicals generated by photo irradiation to a photo polymerization initiator. Molecular weight increases with the ion or radical polymerization, and a monomer or an oligomer that forms a cross-linked structure may be further added if necessary. The photo-curing resin is such hardened resin composition including the functional group, the photo polymerization initiator and the monomer or oligomer. Here, the functional group means the atom group or the coupling scheme which reacts with the vinyl group, the carboxy group, the hydroxyl function and the like.

Such monomer and oligomer includes an unsaturated polyester type, an enethiole type, an acrylic type and the like. Especially, the acrylic type is preferable in terms of the curing speed and the property variation. Among such acrylic type monomers and oligomers, the monofunctional ones include 2-ethylhexyl acrylate, 2-ethylhexyl EO adduct acrylate, ethoxydiethyleneglycol acrylate, 2-hydroxyethyl acrylate, 2-hydroxypropyl acrylate, caprolactone adduct of 2-hydroxyethyl acrylate, 2-phenoxyethyl acrylate, phenoxydiethyleneglycol acrylate, nonylphenol EO adduct acrylate, acrylate of the addition of caprolactone to the nonylphenol EO adduct, 2-hydroxy-3-phenoxypropyl acrylate, tetrahydrofurfuryl acrylate, caprolactone adduct of furfurylalcohol acrylate, acryloylmorpholine, dicyclopentenyl acrylate, dicyclopentanyl acrylate, dicyclopentenyloxyethyl acrylate, isobornyl acrylate, caprolactone adduct of 4,4-dimethyl-1,3-dioxolan acrylate, caprolactone adduct of 3-methyl-5,5-dimethyl-1,3-dioxolan acrylate and the like.

Such acrylic type polyfunctional monomers and oligomers include hexanediol acrylate, neopentyl glycol diacrylate, polyethylene glycol diacrylate, tripropylene glycol diacrylate, hydroxypivalate neopentyl glycolester diacrylate, caprolactone adduct of hydroxypivalate neopentyl glycolester diacrylate, acrylate adduct of diglycidylether of 1,6-hexanediol, diacrylate of acetal compound of hydroxypivalaldehyde and trimethylolpropane, 2,2-bis[4-(acryloyloxydiethoxy)phenyl] propane, 2,2-bis[4-(acryloyloxydiethoxy)phenyl] methane, diacrylate of hydrogenated bisphenol ethyleneoxide adduct, tricyclodecane dimethanol diacrylate, trimethylolpropane triacrylate, pentaerythritol triacrylate, trimethylolpropane propyleneoxide adduct triacrylate, glycerin propyleneoxide adduct triacrylate, dipentaerythritol hexa-acrylate penta-acrylate mixture, acrylate of caprolactone adduct of dipentaerythritol, tris(acryloyloxyethyl)isocyanurate, 2-acryloyloxyethyl phosphate and the like.

Light diffusive particles may be mixed and dispersed in the above-mentioned transparent resins. As for light diffusive particles, particles made of silica, alumina, titania, calcium carbonate, aluminum hydroxide, acrylic resin, organic silicone resin, polystyrene, urea resin and formaldehyde condensate can be used. The particles may consist of either only one kind of the above-mentioned material or combination thereof. In case that the particle has the optical transparency, refraction factor of the particle must be sufficiently different from that of the above-described light transmissive resin in order to make full use of light diffusibility of light diffusive particle. The material for the transparent light diffusive particle will be selected depending on the adopted transparent resin so as to satisfy the above-mentioned refraction factor condition.

Such light diffusive particles are dispersed in the transparent resin in advance so that the liquid of the resin and the particles can be discharged from the droplet discharge head. It is preferable that the surfaces of light diffusive particles are coated with surfactants or a fused resin in order to enhance the dispersibility of light diffusive particles in the optically transparent resin. The surfactant used for the coating will be selected from a cation-based resin, an anion-based resin, a nonion-based resin, an amphoteric resin, a silicon-based resin, a fluoric-based resin and the like depending on the type of light diffusive particle.

The diameter of light diffusive particle is preferably above 5 nm and below 1000 nm, more preferably, 200-500 nm. When it is larger than 200 nm, a fine light diffusiveness can be obtained. When it is smaller than 500 nm, it can be securely discharged from a nozzle of the droplet discharge head.

In this way, the elliptical microlens 30 is made of the optical transparent resin in which light diffusive particles are mixed and dispersed. Therefore, a higher light diffusiveness can be given to the microlens because it is compounded with light diffusive particles. Furthermore, it is possible to decrease the thermo-plasticity of the microlens so that a fine heat resistance can be obtained.

Resins containing an inorganic compound can also be adopted to form the microlens in order to obtain the heat resistance and a fine optical transparency. To be more specific, silicone germanium, titanium and the like can be used. However, the resin containing the silicon is preferable because it is easily obtainable.

As polymers which can form the microlens, there are polysiloxane, polysilane, polysilazane and the like. These compounds contain silicon in their polymeric main chain skeleton and form silicon oxide that is similar to glass by a chemical reaction caused by heat, light, catalyst or the like. Since the silicon oxide formed in such way has a better heat resistance and optical transparency compared to that of the resin only made of organic materials, such polymers are appropriate for forming the microlens.

More specifically, such silicon oxide can be obtained by discharging a solution of polysiloxane having an alkoxy group and solvent, drying the discharged solution, and heating so as to condense the alkoxy group. The silicon oxide can also be obtained by discharging a polysilane solution, irradiating the discharged solution with ultraviolet so as to photo-oxidize the polysilane. The silicon oxide can also be obtained by discharging a polysilazane solution, hydrolyzing the polysilazane with ultraviolet, acid, alkali or the like, and oxidizing it.

In this embodiment, if necessary, a small amount of a surface tension regulator such as fluorinated, silicon-like and nonionic regulator can be added into a droplet of the above-mentioned bank material provided it will not impair a necessary function of the bank. These surface tension regulators improve a wettability of ink when the ink is applied. This helps to improve a leveling property of the applied film and to prevent bubbles from being generated like rash in the film.

The droplet of the bank material prepared in the above-mentioned way preferably has a viscosity of 1-50 mPa·s. This is because when the solution is discharged by the droplet discharge device, if the viscosity is smaller than 1 mPa·s, the area around the nozzle could be easily contaminated by discharged ink. If the viscosity is larger than 50 mPa·s, the frequency of clogging occurring at the nozzle hole increases, making it difficult to smoothly discharge droplets. More preferably, the viscosity lies within the range of 5-20 mPa·s.

Furthermore, the droplet of the prepared bank material preferably has a surface tension of 1-50 mPa·s. This surface tension lies in the range of 0.02-0.07 N/m. This is because when the solution is discharged by the droplet discharge device, if the surface tension is less than 0.02 N/m, the wettability of the droplet with respect to the nozzle surface increases so that the discharge direction tends to be deviated. If the surface tension exceeds 0.07 N/m, the shape of the meniscus at the tip of the nozzle becomes unstable, making it difficult to control the discharge amount and the discharge timing of the droplet.

Method of Curing Bank Material and Microlens Material

To cure the bank material and the microlens material, a thermal treatment and/or a photo treatment is performed in the atmosphere. However, the treatment may be carried out in the inactive gas such as nitrogen, argon, helium and the like. Conditions of the thermal or photo treatment are adequately decided depending on the boiling point of the solvent (vapor pressure), a pressure and a type of an ambient gas, a reaction temperature or a reaction light exposure of the polymerization initiator, a reaction temperature or a reaction light exposure of the cross-linking bond, a glass-transition temperature of the oligomer and the polymer, the temperature limit of the substrate, thermal behavior of the particles such as the dispersibility and the degree of oxidation, and the like.

In the photo treatment, the ultraviolet ray, a far-ultraviolet ray, an electron ray, an X-ray and the like can be used to cure and form the bank. The intensity of the radiation is preferably smaller than 1 J/cm$^2$, more preferably, 0.2 J/cm$^2$ in order to improve productivity. The thermal treatment can be performed by the lamp annealing in addition to a hotplate, an electric furnace and the like. The thermal treatment is preferably performed at the temperature of less than 200° C. in case that the temperature is cooler than the glass-transition temperature of the cured resin. If the substrate is heated to a higher temperature than the glass-transition temperature, the lens could be deformed to have a small curvature because of it runs by heat.

Next, a method of fabricating the elliptical microlens 30 will be briefly described. Four fabrication methods are hereunder described.

First Fabrication Method

FIGS. 5A through 5D are drawings showing a fabrication method of the elliptical microlens 30. The method of fabricating the elliptical microlens 30 by using the droplet discharge method is described with reference to FIG. 5. A first fabrication method includes a step of providing a droplet of the lens material on a substrate, a step of making the droplet elliptical shape by providing another droplet so as to overlap a part of the disposed droplet before the droplet gets harden, and a step of curing the elliptical droplet.

Cleaning process is preferably carried out as a pre-treatment process before the liquid-repellency is given to the substrate P For such cleaning process, for example, ultra violet (UV) cleaning, UV/ozone cleaning, plasma cleaning, acid/alkaline cleaning and the like can be adopted.

Next, the surface of the substrate P is treated. This surface treatment of the substrate P is to impart a liquid-repellency to the surface of the substrate P so as to obtain an aimed contact angle. This treatment is performed in order to make a landing diameter of the bank material droplet smaller. As the method of imparting the liquid-repellency to the surface of the substrate P, to form an organic thin film on the surface of the substrate P, a plasma treatment and the like can be adopted. Here, the organic thin film is formed and a liquid-repellency is given to the surface of the substrate P.

Figure 5A:
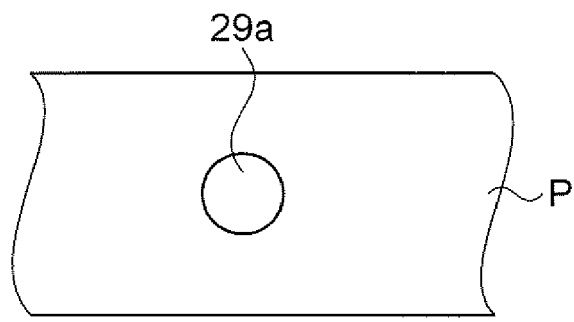
FIGS. 5A through 5D are drawings showing a fabrication method of a microlens with an elliptical figure.
Figure 5B:
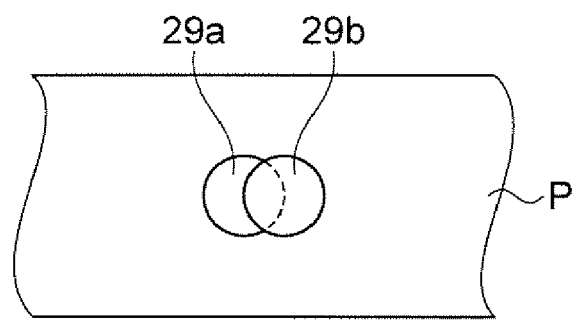
Figure 5C:
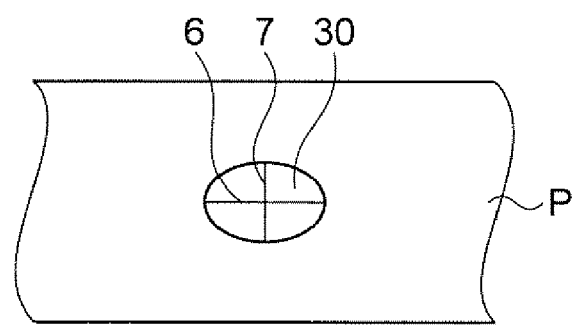
Figure 5D:
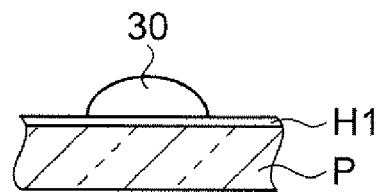

Next, in the step of providing the droplet of the microlens material, the microlens material is discharged from a droplet discharge head 1 in the form of droplets and a droplet 29a is disposed on the liquid-repellent substrate P (see FIG. 5A). Conditions of the droplet discharge are, for example, the droplet weight of 4 ng/dot and the droplet (discharge) speed of 5-7 mm/sec. The atmosphere in which the droplet is discharged is preferably set to have the temperature of less than 60° C. and the humidity of less than 80%. In this way, the discharge nozzle of the droplet discharge head 1 will not be clogged and the droplet will be stably discharged form it. The thermo-setting resin can also be adopted as the microlens material other than the photo-curing resin. The resin can be either polymer or monomer. If the monomer is provided in a liquid form, the monomer itself can be used instead of the solution of the monomer. Polymer solution that is insensible to light and heat may also be adopted. The droplet 29a is easily repelled on the substrate surface since the liquid repellency is imparted to the substrate P surface, and the droplet 29a tends to become hemispheroid.

Next, in the step of forming the elliptical droplet, another droplet 29b of the microlens material is discharged from the droplet discharge head 1 so as to position it next to the droplet 29a provided on the substrate P (see FIG. 5B) before the droplet 29a is harden. If the droplet 29b is provided so as to cover a part of the droplet 29a but not to be positioned at the same place where the droplet 29a is positioned, the droplet 29b contacts and merges with the droplet 29a. Since the position of the droplet 29b is slightly different from the position of the droplet 29a, the resulting droplet tends to have an elliptical shape.

Finally, in the step of curing the elliptical droplet, a treatment to cure the microlens material in the form of the droplet provided on the substrate P is performed in order to preserve the shape of the droplet. In this way, the elliptical microlens 30 is formed (see FIGS. 5C and 5D). Meanwhile, a liquid repellent layer H1 to which the liquid repellency is given is formed on the substrate P. Furthermore, the plurality of the microlenses 30 is formed and then the microlens array 35 in which the major axes 6 of the microlenses align in the same direction (see FIG. 2) is formed.

Second Fabrication Method

FIGS. 6A through 6G are drawings showing a fabrication method of the elliptical microlens 30. The method of fabricating the elliptical microlens 30 is described with reference to FIG. 6. The material for the microlens, the surface treatment method, the disposing method, the curing treatment method and the like in a second fabrication method are the same as those in the first fabrication method so that the descriptions here are omitted. A second fabrication method includes a step of providing a first droplet of the lens material on a substrate, a step of curing the first droplet to form a lens, a step of providing a second droplet so as to overlap a part of the first droplet, the amount of the second droplet is smaller than that of the first droplet, a step of curing the second droplet to form a elliptical lens, a step of further providing a third droplet so as to overlap a part of the elliptical lens and at the opposite side of the second droplet, and a step of curing the third droplet.

In the second fabrication method, firstly, the substrate P is cleaned in the same way as the first fabrication method and the liquid-repellency is given to the surface of the substrate P.

Figure 6A:
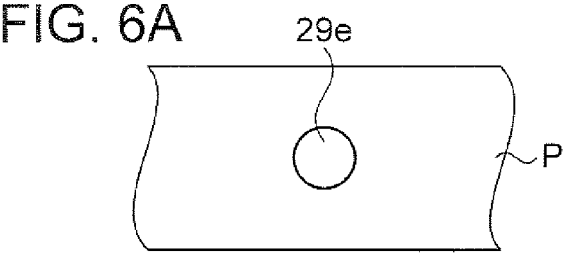
FIGS. 6A through 6G are drawings showing a fabrication method of the elliptical microlens.

Secondly, in the step of providing a first droplet of the lens material, the microlens material is discharged through the droplet discharge head 1 in the form of the droplet, and a droplet 29e is provided on the liquid repellent substrate P (see FIG. 6A).

Figure 6B:
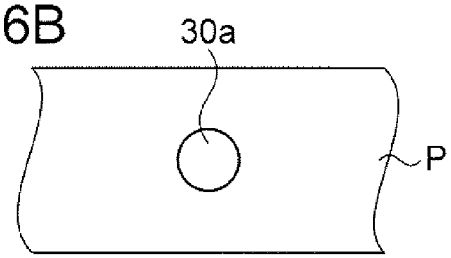

Thirdly, in the step of curing the first droplet to form a lens the droplet 29e is cured and a lens 30a is formed (see FIG. 6B).

Figure 6C:
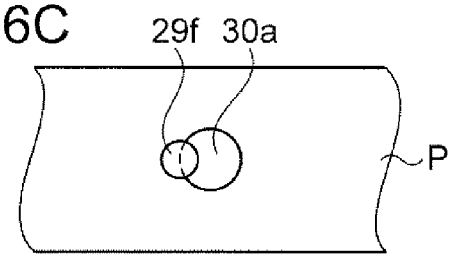

Fourthly, in the step of providing a second droplet so as to overlap a part of the first droplet, a droplet 29f is provided so as to cover a part of the lens 30a (see FIG. 6C). The volume of the droplet 29f is smaller than that of the droplet 29e so that the size of the droplet 29f is smaller than that of the droplet 29e. When the droplet 29f is provided, the droplet 29f spreads out and becomes a substantially elliptical shape though which is not shown in the figure.

Figure 6D:
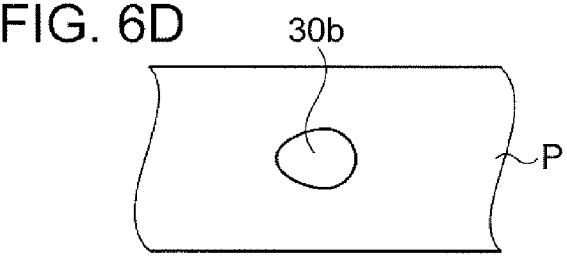

Fifthly, in the step of curing the second droplet to form an elliptical lens, the droplet 29f is cured and a substantially elliptical lens 30b is formed (see FIG. 6D).

Figure 6E:
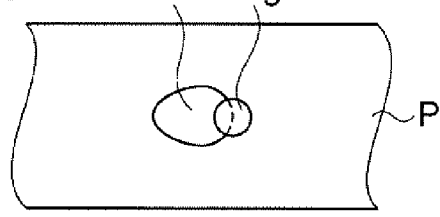

Sixthly, in the step of further providing a third droplet, a droplet 29 is provided so as to overlap a part of the lens 30b (see FIG. 6E). The volume of the droplet 29g is smaller than that of the droplet 29e so that the size of the droplet 29g is smaller than that of the droplet 29e. When the droplet 29g is provided, the droplet 29g spreads out and becomes a substantially elliptical shape though which is not shown in the figure.

Figure 6F:
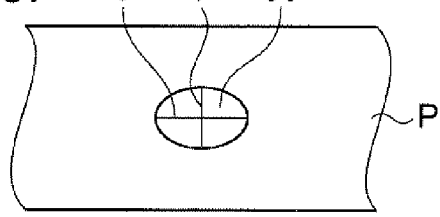
Figure 6G:
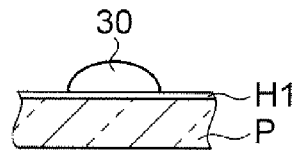

Finally, in the step of curing the third droplet, the elliptical microlens 30 is formed by curing the droplet 29g (see FIG. 6F, 6G). Meanwhile, the liquid repellent layer H1 to which the liquid repellency is given is formed on the substrate P. Furthermore, the plurality of the microlenses 30 is formed and then the microlens array 35 in which the major axes 6 of the microlenses align in the same direction is formed (see FIG. 2).

Third Fabrication Method

FIGS. 7A through 7F are drawings showing a fabrication method of the elliptical microlens 30. The method of fabricating the elliptical microlens 30 is described with reference to FIG. 7. A third fabrication method includes a step of providing a first droplet of the bank material on a substrate, a step of curing the first droplet provided on the substrate to form a base having an elliptical figure, a step of providing a second droplet of a lens material on the elliptical base, and a step of curing the second droplet to form a elliptical lens, and a step of curing the second droplet.

In the third fabrication method, firstly, the substrate P is cleaned in the same way as the first fabrication method and the liquid-repellency is given to the surface of the substrate P.

Figure 7A:
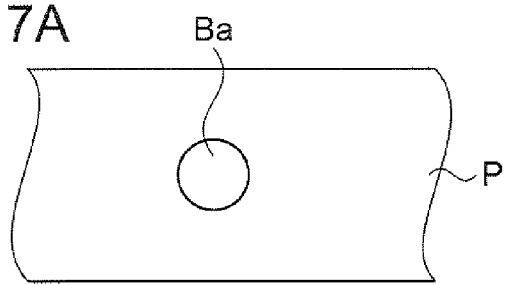
FIGS. 7A through 7F are drawings showing a fabrication method of the elliptical microlens.
Figure 7B:
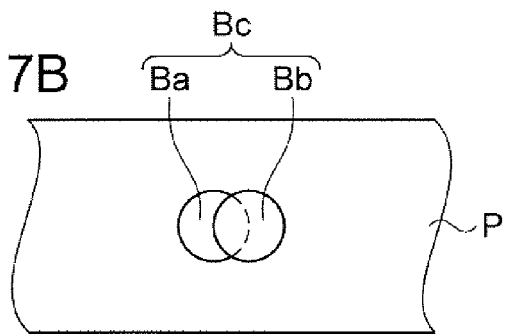
Figure 7C:
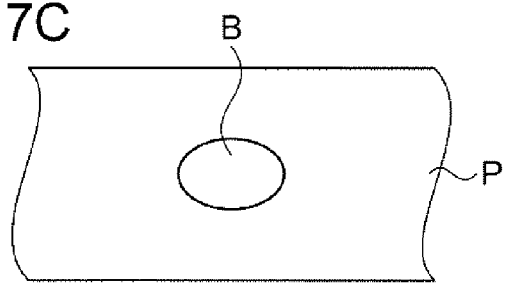

Next, in the step of curing the first droplet, the bank material is discharged from the droplet discharge head 1 in the form of droplets and a droplet Ba is disposed on the liquid-repellent substrate P (see FIG. 7A). Conditions of the droplet discharge are, for example, the droplet weight of 4 ng/dot and the droplet (discharge) speed of 5-7 mm/sec. The atmosphere in which the droplet is discharged is preferably set to have the temperature of less than 60° C. and the humidity of less than 80%. In this way, the discharge nozzle of the droplet discharge head 1 will not be clogged and the droplet will be stably discharged form it.

Subsequently, another droplet Bb is discharged from the droplet discharge head 1 so as to position it next to the droplet Ba provided on the substrate P (see FIG. 7B) before the droplet Ba is harden. If the droplet Bb is provided so as to cover a part of the droplet Ba but not to be positioned at the place where the droplet Ba is provided, the droplet Bb contacts and merges with the droplet Ba. Since the position of the droplet Bb is slightly different from the position of the droplet Ba, a resulting droplet Bc tends to have an elliptical shape.

Next, in the step of forming a base having an elliptical figure, an elliptical bank B (see FIG. 7C) is formed by volatilizing (evaporating) and drying the solvent contained in the droplet Bc provided on the substrate P and then curing the droplet Bc. It is preferable that the bank B is treated in advance to impart the liquid repellency. If the liquid repellency is given to the surface of the bank B, it is possible to prevent the microlens material provided on the B from overflowing from the bank B surface.

Figure 7D:
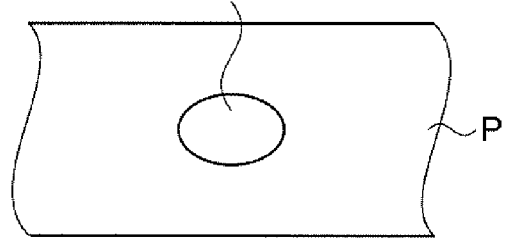

Next, in the step of providing a second droplet of a lens material on the elliptical base, a microlens material is discharged in the form of a droplet through the droplet discharge head 1 and the droplet 29i is provided on the elliptical bank B formed on the substrate P (see FIG. 7D). The droplet 29i of the microlens material forms an elliptical figure.

Figure 7E:
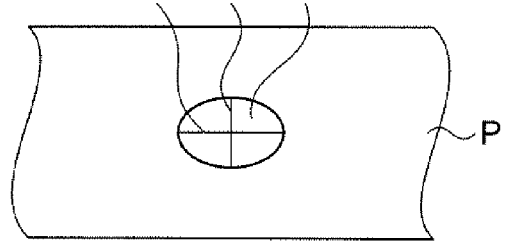
Figure 7F:
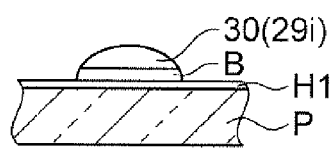

Finally, in the step of curing the second droplet, the elliptical microlens 30 is formed by curing the droplet 29i (see FIGS. 7E, 7F). Meanwhile, the liquid repellent layer H1 to which the liquid repellency is given is formed on the substrate P. Furthermore, the plurality of the microlenses 30 is formed and then the microlens array 35 in which the major axes 6 of the microlenses align in the same direction is formed (see FIG. 2).

Forth Fabrication Method

FIGS. 8A through 8E are drawings showing a fabrication method of the elliptical microlens 30. The method of fabricating the elliptical microlens 30 is described with reference to FIG. 8. A forth fabrication method includes a step of providing a plurality of droplets of a lens material on a substrate in such a way that each of the droplets is separately provided, a step of curing the plurality of the droplets to form a plurality of lenses, a step of further providing droplets among the lenses, and a step of curing the droplets.

In the forth fabrication method, firstly, the substrate P is cleaned in the same way as the first fabrication method and the liquid-repellency is given to the surface of the substrate P.

Figure 8A:
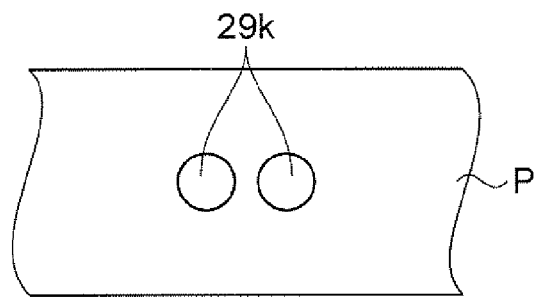
FIGS. 8A through 8E are drawings showing a fabrication method of the elliptical microlens.

Firstly, in the step of providing a plurality of droplets of a lens material in such a way that each of the droplets is separately provided, the microlens material is discharged in the form of a droplet through the droplet discharge head 1 and the droplet 29k is provided in a plural number (in this case, two droplets) on the liquid repellent substrate P (see FIG. 8A).

Figure 8B:
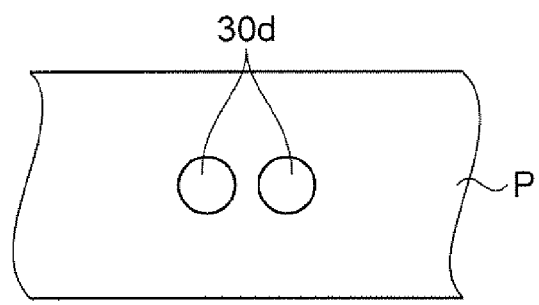

Next, in the step of curing the plurality of the droplets to form a plurality of lenses, a lens 30d is formed by curing the droplet 29k which is provided in the plural number (see FIG. 8B).

Figure 8C:
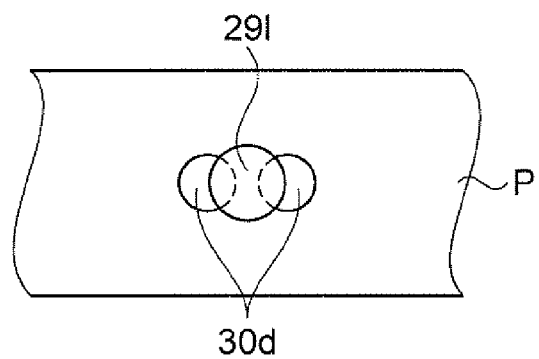

Next, in the step of further providing droplets, a droplet 29l is provided so as to fill the gap between the two adjacent lens 30d (see FIG. 8C). When the droplet 29l is provided, the droplet 29l spreads out and becomes a substantially elliptical shape. It is preferable that the volume of the droplet 29l is larger than that of the droplet 29k because it is possible to form a more refined elliptical figure.

Figure 8D:
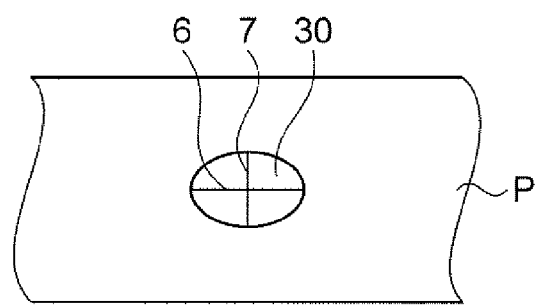
Figure 8E:
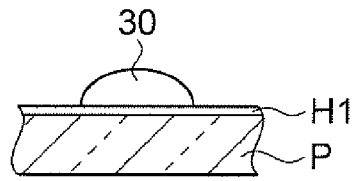

Finally, in step of curing the droplets, the elliptical microlens 30 is formed by curing the droplet 29l (see FIGS. 8D, 8E). Meanwhile, the liquid repellent layer H1 to which the liquid repellency is given is formed on the substrate P. Furthermore, the plurality of the microlenses 30 is formed and then the microlens array 35 in which the major axes 6 of the microlenses align in the same direction is formed (see FIG. 2).

The microlens 30 is formed by the droplet discharge method according to the above-described first-forth fabrication methods. Accordingly, the microlens 30 formed on the substrate P has a convex and ellipsoidal shape (see FIG. 1 and FIG. 3)

According to the embodiments described above, the following advantageous effects can be obtained.

I. The elliptical microlens 30 in the backlight unit 40 has the minor axis 7 whose curvature is larger than that of the major axis 6 so that light is less diffused and the brightness is higher in the major axis direction in the microlens 30. Furthermore, the microlens 30 is provided in such a way that the longitudinal axis direction of the linear lamp 41 which is the light source is orthogonal to the longitudinal axis direction of the microlens 30 so that it is possible to decrease the amount of light leaking out from the peripheral of the screen in all direction. Therefore, the brightness can be increased. In this way, the backlight unit 40 with a high brightness can be provided. When the backlight unit 40 has a high luminosity, the number of the linear lamp 41 which is the light source does not have to be increased. Consequently, the problems of the heat generated by the linear lamp 41, the manufacturing cost and the weight of the lamp 41 will not rise. In addition, it is possible to provide a light-weight back light unit because the number of the linear lamp 41 can be decreased. In a case that the same number of the linear lamp 41 is provided as a conventional one, the brightness of the backlight unit 40 will become higher than that of the conventional one.

II. The linear lamp 41 is provided between the reflecting plate 44 and the diffusing plate 43 so that the amount of light leaking out of the screen can be reduced. Accordingly, it is possible to provide the backlight unit 40 with a higher brightness.

III. The plurality of the elliptical microlenses 30 is are densely arranged in the staggered alignment on the substrate P so that the amount of light passing through the microlens is increased because more microlenses can be provided compared to the case in which the microlenses are not arranged in the staggered alignment. Light will be less diffused in the orthogonal direction to the longer axis direction of the linear lamp 41 (in other words, the major axis direction of the microlens) which is the light source. Accordingly, it is possible to provide the backlight unit 40 with a higher brightness.

IV. Since the elliptical microlens 30 is formed on the substrate P by the droplet discharge method according to the embodiment, design change such as a figure (size) and a position change can be easily done by changing the conditions of the droplet discharge. This means that it is not necessary to make a new metal mold each time of the design change such as the figure (size) and the position change. Therefore, the method according to the embodiment will not cost to make the mold and the manufacturing cost of the microlens can be reduced.

A liquid crystal display device 100, which is an example of the electrooptical device equipped with the backlight unit 40 having the diffusing plate 43 according to the embodiment, will be now described.

Figure 9:
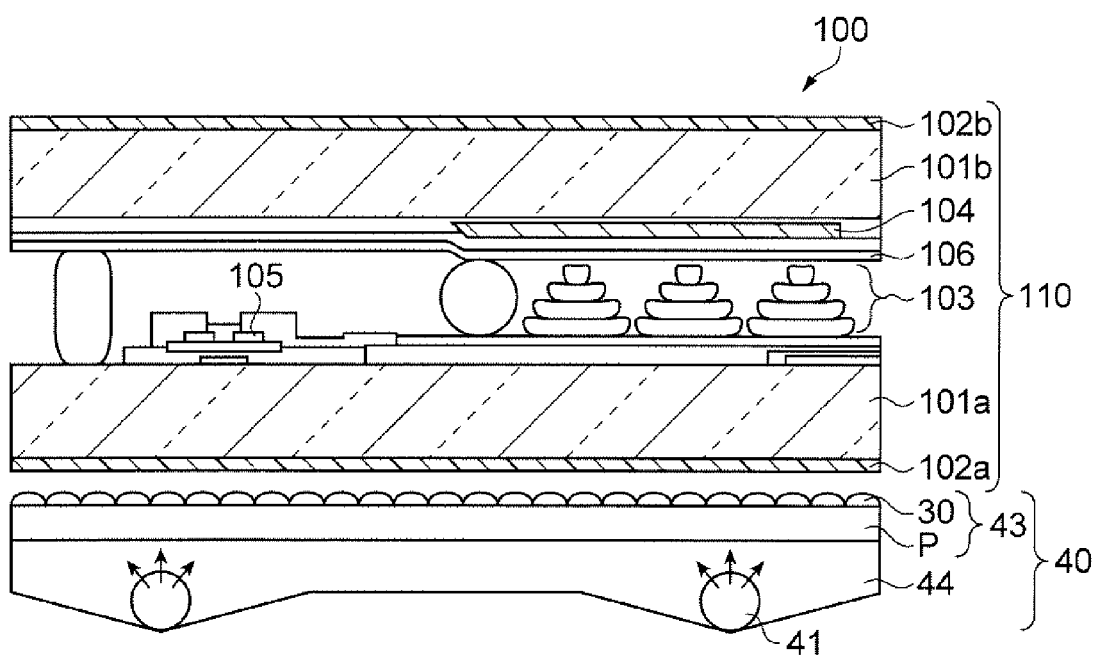
FIG. 9 illustrates an embodiment of a liquid crystal display device.

FIG. 9 shows the liquid crystal display device 100. In FIG. 9, the scale of a liquid crystal panel is not consistent with the scale of the backlight unit 40. The liquid crystal display device 100 has the backlight unit 40, the liquid crystal panel 110, a driver LSI (not shown in the figure) and the like. The liquid crystal panel 110 includes a pair of glass substrates 101a, 101b, a pair of polarizing plates 102a, 102b, liquid crystal 103, a color filter 104 and the like. The polarizing plates 102a, 102b are adhered on the outer faces of the glass substrates 101a, 101b. A thin film transistor (TFT) 105 and the like are formed on the inner face of the glass substrate 101a. The color filter 104, an alignment film 106 and the like are formed on the inner face of the glass substrate 101b. The liquid crystal 103 is disposed between the glass substrate 101a and the glass substrate 101b.

The glass substrates 101a, 101b are transparent substrates forming the liquid crystal panel 110. The polarizing plates 102a, 102b can transmit or absorb a specific polarization component. A property of the liquid crystal 103 can be adjusted by mixing a few kinds of nematic liquid crystal. The color filter 104 is a resin film containing colorant or pigment having three primary colors of red (R), green (G) and blue (B). The alignment film 106 is an organic thin film for aligning the liquid crystal 103 and typically made of a polyimide thin film.

Light emitted from the backlight unit 40 passes through the polarizing plate 102a and the glass substrate 101a, and then enters through the liquid crystal 103, the alignment film 106 and the color filter 104 in order. In this way, a certain image or vision can be displayed on the liquid crystal panel 110. Since the backlight unit 40 has fine optical characteristics and its weight can be reduced, it is possible to provide the liquid crystal display device 100 with the fine optical properties and to reduce the weight of the liquid crystal device 100 which is the electrooptical device. Furthermore, it is possible to improve the productivity of the backlight unit 40 and the liquid crystal display device 100 because the diffusing plate 43 having the elliptical microlens 30 is manufactured by the droplet discharge method according to the embodiment of the invention.

Figure 10:
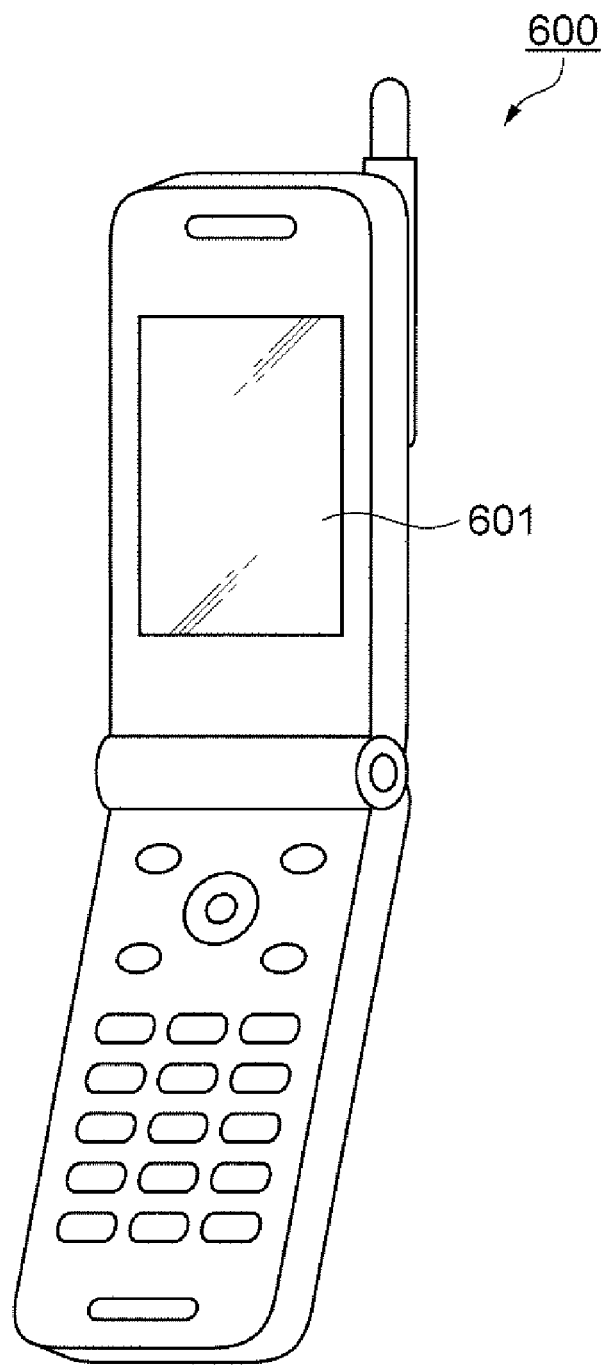
FIG. 10 shows a cellular phone as an example of electric equipment according to the embodiment of the invention.

FIG. 10 shows a cellular phone 600 as an example of electronic equipment having the liquid crystal display device 100 shown in FIG. 9 as the electrooptical device. The cellular phone 600 and a liquid crystal display part 601 having the liquid crystal display device 100 are shown in FIG. 10. Because the cellular phone 600 is equipped with the liquid crystal display device 100 which has the fine optical properties and whose weight is reducible, it is possible to provide the cellular phone 600 with the fine optical properties and to reduce the weight of the cellular phone 600 which is the electronic equipment. Moreover, it is possible to improve the productivity of the cellular phone 600 because it has the liquid crystal display device 100 with the high productivity.

The foregoing description has been given by way of example only and it will be appreciated by a person skilled in the art that modifications including the following modification examples can be made without departing from the scope of the present invention.

FIRST MODIFICATION EXAMPLE

The backlight unit 40 in the above-described embodiment has the linear lamp 41 that is provided between the reflecting plate 44 and the diffusing plate 43 and directly below the screen. However, the position of the linear lamp 41 is not limited to this. For example, the linear lamp 41 can be placed at the side of light guide plate, which is called a side-light type. In this case, light is virtually provided in such a way that the major axis direction of the microlens 30 also orthogonally crosses the longer axis direction of the linear lamp 41. Accordingly, it is possible to reduce the amount of light leaking out of the screen, making the brightness of the screen higher, Therefore, the same advantageous effect as the above-described embodiment can be obtained and the high luminosity backlight unit 40 can be provided.

SECOND MODIFICATION EXAMPLE

Though the elliptical microlens 30 has the convex shape in the backlight unit 40 according to the above-described embodiment, the case is not limited to this. For example, the elliptical microlens 30 can be formed to have a concave shape by utilizing a pinning effect in a so called coffee stain phenomenon. In this case, the same advantageous effect as that of the above-described embodiment can also be obtained and it is possible to provide the high luminosity backlight unit 40.

THIRD MODIFICATION EXAMPLE

Though the elliptical microlens 30 is formed by the droplet discharge method in the above-described embodiment, the microlens can be formed by other methods. For example, the elliptical microlens 30 can be mold by using a metal pattern and the like. In this case, the same advantageous effect as that of the above-described embodiment can also be obtained and it is possible to provide the high luminosity backlight unit 40.

FORTH MODIFICATION EXAMPLE

The elliptical microlens 30 is provided so as to orthogonally cross the linear lamp in the backlight unit 40 according to the above-described embodiment. However, the case to which the invention can be applied is not limited to this. For example, some of the elliptical microlenses 30 may be arranged parallel with the linear lamp. Even in this way, the same advantageous effect as that of the above-described embodiment can also be obtained and it is possible to provide the high luminosity backlight unit 40.

What is claimed is:

1. A display device, comprising:
   a plurality of light sources, each emitting light;
   a reflecting plate having a plurality of planar faces arranged to define a plurality of V-shaped channels, each of the plurality of light sources being disposed substantially within a corresponding one of the plurality of channels;
   a light diffusing plate diffusing light emitted from the plurality of light sources, the light diffusing plate having a plurality of ellipsoidal microlenses, a major axis direction of the plurality of microlenses being substantially orthogonal to a longer axis direction of the plurality of light sources, and the light diffusing plate being disposed relative to the plurality of light sources at a substantially equal distance from each of the plurality of light sources; and
   a display screen that is disposed directly over the plurality of light sources.

2. The display device according to claim 1, wherein the plurality of microlenses are arranged in rows along the major axis direction and wherein the rows are offset with respect to each other along the major axis direction.

3. The display device according to claim 1, wherein each of the plurality of microlenses is formed by a droplet discharge method.

4. The display device according to claim 1, wherein the display screen includes a liquid crystal panel.

5. A method of manufacturing a display device that has a plurality of light sources emitting light, a reflection plate having a plurality of planar faces arranged to define a plurality of channels, a display screen, and a diffusing plate diffusing light emitted from the light source, the method comprising:
   forming the reflection plate such that the plurality of channels are V-shared;
   forming the diffusing plate to have a plurality of ellipsoidal microlenses; and
   assembling the display device such that a major axis direction of the plurality of microlenses is orthogonal to a longer axis direction of the plurality of light sources, such that each of the plurality of light sources is disposed substantially within a corresponding one of the plurality of channels, the light diffusing plate is disposed relative to the plurality of light sources at a substantially equal distance from each of the plurality of light sources, and such that the display screen is disposed directly over the plurality of light sources.

6. The method of manufacturing a display device according to claim 5, wherein the plurality of microlenses are arranged in rows along the major axis direction and wherein the rows are offset with respect to each other along the major axis direction.

7. The method of manufacturing a display device according to claim 5, wherein each of the plurality of microlenses is formed by a droplet discharge method.

8. An electronic device comprising:
   a plurality of light sources, each emitting light;
   a reflecting plate having a plurality of planar faces arranged to define a plurality of V-shared channels, each of the plurality of light sources being disposed substantially within a corresponding one of the plurality of channels;
   a light diffusing plate diffusing light emitted from the plurality of light sources, the light diffusing plate having a plurality of ellipsoidal microlenses, a major axis direction of the plurality of microlenses being substantially orthogonal to a longer axis direction of the plurality of light sources, and the light diffusing plate being disposed relative to the plurality of light sources at a substantially equal distance from each of the plurality of light sources; and
   a display screen that is disposed directly over the plurality of light sources, the display screen including a liquid crystal panel.

* * * * *